March 6, 1928.

E. H. McKINNEY 1,661,843

HYDRAULIC BRAKE

Original Filed June 1, 1925   3 Sheets-Sheet 1

INVENTOR.
EDWARD H. McKINNEY.
BY
U.G. Charles
ATTORNEY.

March 6, 1928.

E. H. McKINNEY 1,661,843

HYDRAULIC BRAKE

Original Filed June 1, 1925    3 Sheets-Sheet 2

INVENTOR.
EDWARD H. McKINNEY.
BY
E. G. Charles
ATTORNEY.

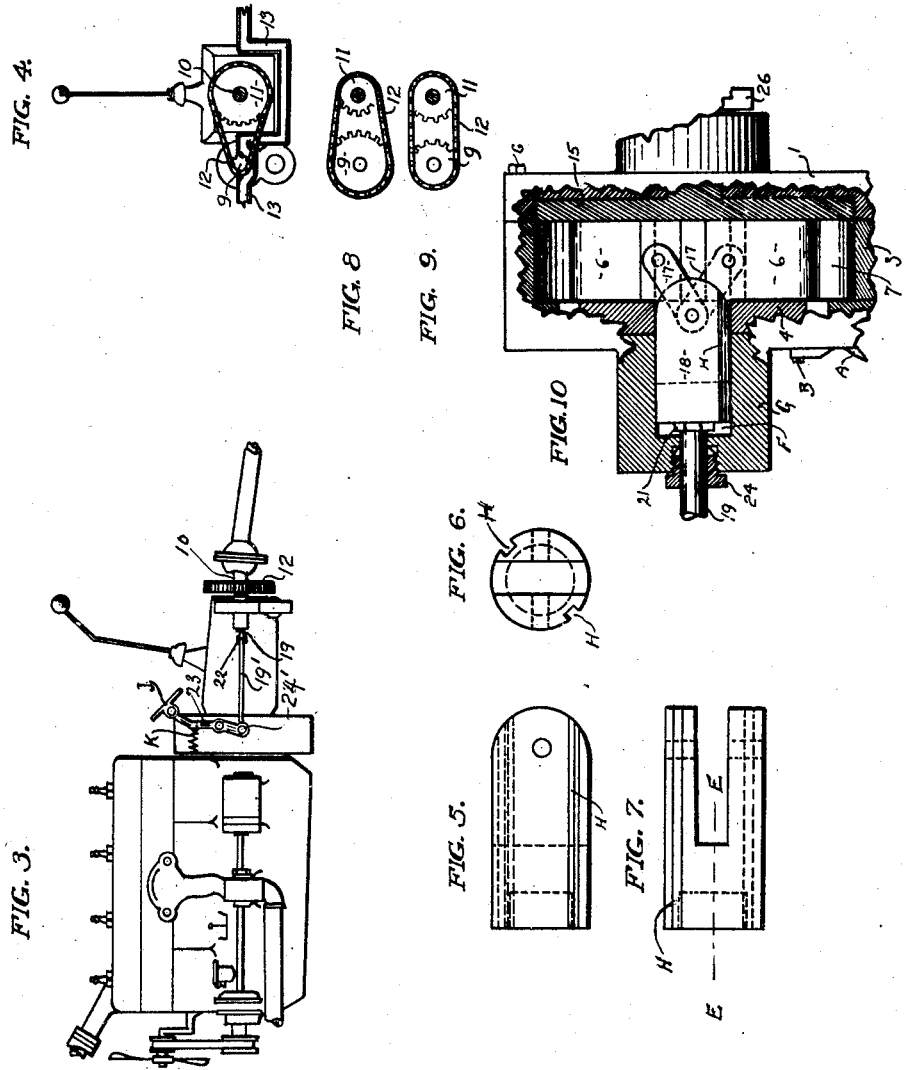

Patented Mar. 6, 1928.

1,661,843

UNITED STATES PATENT OFFICE.

EDWARD H. McKINNEY, OF SALINA, KANSAS.

HYDRAULIC BRAKE.

Application filed June 1, 1925, Serial No. 34,027. Renewed August 1, 1927.

My invention relates to a hydraulic brake for motor driven vehicles.

The objects of my invention are as follows: First to provide a brake acting directly on the drive shaft, second, to provide a brake as an attachment to a motor driven vehicle whereby the usual brake drum and band may be discarded, third, to provide a hydraulic braking means that the housing for the transmission may be made to contain the said brake mechanism, that is to say the housing for the transmission and one side of the housing for the brake may be integral, fourth, to provide a hydraulic brake to be positioned preferably between the transmission case and the universal joint so that the engaging means with the drive shaft will not be disturbed by the vertical spring motion of the chassis. These and other objects will be hereinafter more fully explained.

Referring to the drawings:

Fig. 1 is a side view of the rollers, the cap being removed for convenience of illustration. Fig. 2 is a cross section through the housing, the rollers and other elements in connection therewith being in elevation. Fig. 3 is a reduced drawing showing the side of an internal fuel combustion engine such as commonly used in motor vehicles and showing my improved hydraulic brake engaging near the rear of the transmission case. Fig. 4 is a rear view of the braking means. Fig. 5 is a side view of the toggle joint crosshead.

Fig. 6 is an end view of Fig. 5.

Fig. 7 is a transmission side view of Fig. 5.

Figs. 8 and 9 are modifications for the timing gears of the brake. Fig. 10 is a detail view of the crosshead action blades disengaged.

Figure 1:
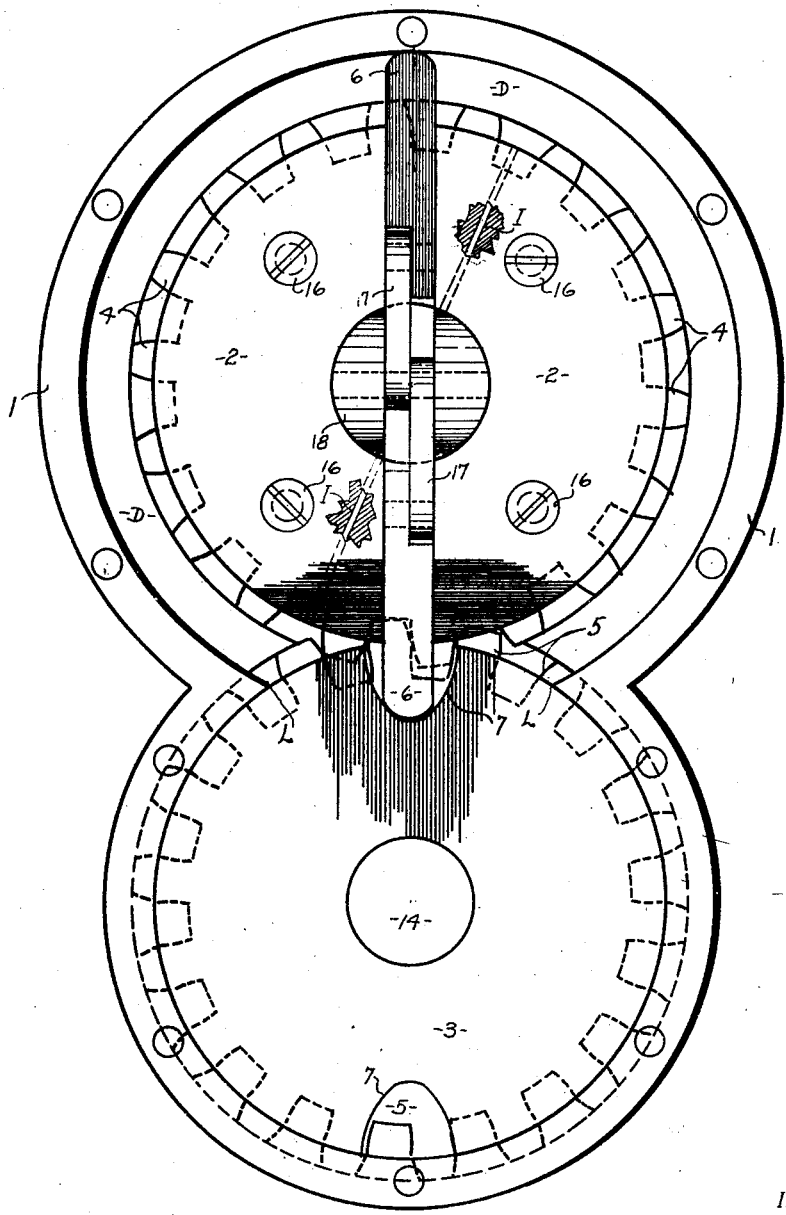

1 is the housing, being made in several parts for convenience of assembling the mechanism contained therein, the said parts will hereinafter be more fully explained.

In the said housing are rotatably mounted rollers 2, and 3 and on one side of said rollers are firmly attached gears, 4 and 5 the said gears being in mesh so that the rotations thereof will bring to proper engagement the ends of blades 6 in roller 2, and the notches 7 in roller 3, for the purpose hereinafter described.

Roller 2 has a journal 8 rigidly connected thereto and on said journal is a sprocket 9; on the drive shaft 10 is mounted a sprocket 11, the said sprockets having a chain 12 engaging thereon as actuating means for the brake mechanism, the sprocket 11 is the driving means for said brake.

It will be understood that the brake will be supported by a cross frame 13 as shown in Fig. 4, but omitted in all other figures, the said frame being rigidly connected to the chassis of the vehicle and shaped to avoid contact with parts in alignment therewith.

The roller 3 is rotatably mounted in the sides of the housing by a journal 14, to remove said roller from the housing a cap A, being held in position by screws B, may be removed, and to install or remove rollers 2 the side of the housing attached by cap screws C, may be removed, it will be understood that all joints will be oil tight when assembled.

The roller 2 is constructed of two semi-circular members firmly clamped between gear 4 and disc 15, the said parts being fastened together by screws 16 and interposed therein and slideably mounted between the semi-circular members are blades 6 actuated by toggle links 17, for expansion and contraction of the said blades, (the ends of which pass through a compression chamber D) the said links being pivotably connected to, and actuated by a crosshead 18, the said crosshead having seated in the end thereof a pushrod 19, the said rod having a flange on the end as at 20 and held to engagement by a collar 21 which is threaded in the socket end of said crosshead allowing said crosshead to rotate freely.

Figure 2:
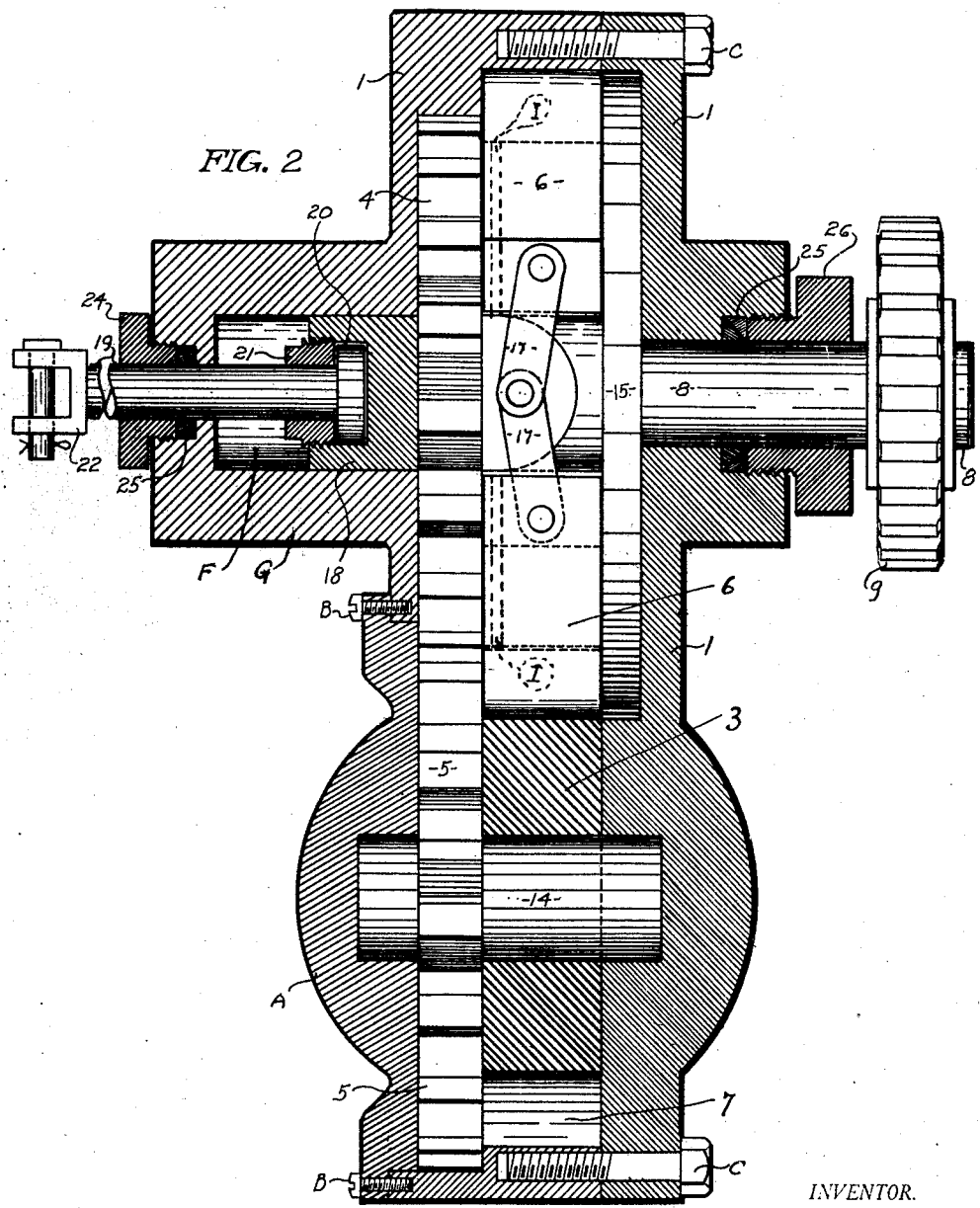

The sectional view of the crosshead in Fig. 2 is taken on line E. E. in Fig. 7.

The reciprocations of the crosshead in the bore F, of the hub G will play freely by reason of bypasses H, longitudinally disposed in the crosshead by which means the oil can displace and in conjunction therewith communication will be had through ports I into compression chamber D, until closed by the crosshead at the maximum braking position, it being understood that all cavities in the housing, that is to say, the space between the walls of said housing and the members housed therein is filled with fluid, (oil preferably used).

The pushrods 19 and 19' are pivotably connected by a yoke 22, to accommodate the rocking motion of the brake lever 23, the said rod 19' being pivotably connected to said lever as at 24.

In operating my hydraulic brake the action will be as follows:

When it is desired to check the movement of the vehicle the operator will place his foot on the brake pedal J, which is actuating means for the pushrod engaging in the end of the crosshead, and under the pressure the blades 6 may be made to pass slowly across the compression chamber D, by which means a resistance of the revolutions of roller 2 will take place, and when said blades are in contact with the inside periphery of the outside wall, the revolutions will be stopped at that instant, by reason of the compression that takes place between the blade and the point of contact between rollers 2 and 3.

This resistance being transmitted from sprocket 9 of the braking means to sprocket 11 on the drive shaft of the vehicle by means of chain 12, therefore it will be readily seen how my hydraulic brake will retard the revolutions of the driving wheels of a motor driven car, when the foot is released from the brake pedal the crosshead will return to its normally disengaging position as shown in Fig. 10 by reason of a spring K tensioning the brake lever as shown in Fig. 3.

It will be understood that when the blades are engaged to their maximum and in alignment with the axis of both rollers, (as shown in Fig. 1) or varying therefrom to the point of intersections of the points L. L. the peripheral walls of notch 7 will be continuously in contact with the end of the blade, therefore, the compression is maintained until the periphery of the rollers are in engagement on either side of said notch, the said notches and blades are so timed that they will slideably engage when the blades are expanded to their maximum, but the compression may be exercised at any point during the revolutions and when the blades are drawn back even with the periphery of the roller, the rollers will rotate freely, having no resistance in the compression chamber.

The power transmitting means to my brake may be varied by using gears instead of the chain and sprocket, housings may also be provided for the engaging means.

Having fully described my invention I would have it understood that such modifications may be employed as lies within the scope of the appended claims and what I claim as new and desire to secure by Letters Patent is:—

1. In a hydraulic brake for motor driven vehicles, a housing having two rollers rotatably mounted therein, an annular compression chamber about the periphery of one of said rollers, said chamber being filled with oil concentrically positioned within said compression chamber, blades on the diametrical axis of said roller, said blades actuated by a toggle sliding said blades radially in opposite direction so that the ends thereof will cross said compression chamber, a shaft and toggle crosshead carrying said roller, a sprocket rigid on said shaft, said sprocket adapted to engage a sprocket on the drive shaft of the vehicle by means of a chain, a roller adjacent to first said roller so that the periphery of each will contact in their rotations, notches in the face of said roller, said notches being opposite each other and on the diametrical axis, gears on the corresponding sides of said rollers, said gears being in mesh so that the rotations of both rollers will be timed equal for the engagement of said blades and notches, a pushrod engaging with said crosshead, said rod and crosshead actuated by a foot lever all for the purpose described.

2. In a hydraulic brake for motor driven vehicles, in combination with the drive shaft of a motor driven vehicle, a brake comprising a housing rigidly attached to the frame of said vehicle, said housing to contain a quantity of fluid, a plurality of rollers rotatably mounted within said housing, said rollers having equal rotations being actuated by gears on each side thereof, blades slideably interposed in one of said rollers, a crosshead and toggle links reciprocating said blades in opposite directions from the axis of said roller, a compression chamber encircling said roller, a journal rigidly connected to said roller and rotatably engaging in a hub, on the opposite side of said roller a crosshead rotatably mounted in a hub, the said crosshead and journal functioning as bearings for said rollers, a gear on said journal, a chain engaging said gear with the gear on the drive shaft of the vehicle, a roller adjacent to first said roller notches in said roller, said notches adapted to receive the projecting ends of said blades in their rotations the periphery of both of said rollers firmly engaging, functioning as a stop in said compression chamber, a pushrod and a brake lever for actuating said toggle.

3. In a hydraulic brake for motor driven vehicles, a brake comprising a housing having a plurality of rollers rotatably mounted therein, one of said rollers concentric to an annular compression chamber and on said housing a hub for the reciprocation of a toggle joint crosshead, the bore in said hub and said compression chamber being filled with fluid, bypasses in said crosshead ports in the adjacent roller communicating with each other for the displacement of the fluid as the said crosshead and blades in the roller reciprocate, the ports in said roller being closed by said crosshead when maximum engagement of the blades are imposed.

EDWARD H. McKINNEY.